(12) United States Patent
Berstis

(10) Patent No.: US 6,542,824 B1
(45) Date of Patent: Apr. 1, 2003

(54) METHOD AND SYSTEM FOR DETERMINING POSITION INFORMATION UTILIZING A PORTABLE ELECTRONIC DEVICE LACKING GLOBAL POSITIONING SYSTEM (GPS) RECEPTION CAPABILITY

(75) Inventor: Viktors Berstis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 175 days.

(21) Appl. No.: 09/240,926

(22) Filed: Jan. 29, 1999

(51) Int. Cl.[7] ............................................... G01C 21/00
(52) U.S. Cl. ........................................ 701/220; 701/207
(58) Field of Search .................................. 701/207, 220; 342/357.01, 357.08

(56) References Cited

U.S. PATENT DOCUMENTS

| | | | |
|---|---|---|---|
| 5,245,537 A | * | 9/1993 | Barber ........................ 364/410 |
| 5,406,489 A | | 4/1995 | Timothy et al. |
| 5,617,317 A | | 4/1997 | Ignagni |
| 5,774,832 A | * | 6/1998 | Vanderwerf .................. 701/220 |
| 5,881,321 A | * | 3/1999 | Kivolowitz .................... 396/53 |
| 5,956,660 A | * | 9/1999 | Neumann ..................... 701/220 |

* cited by examiner

Primary Examiner—Ian J. Lobo
(74) Attorney, Agent, or Firm—Jeffrey S. LaBaw; Bracewell & Patterson, L.L.P.

(57) ABSTRACT

A portable electronic device that can obtain position information despite lacking GPS reception capability includes data storage that stores a reference position, a plurality of inertial motion sensors, and computational circuitry. The inertial motion sensors detect movement of the portable electronic device and output motion signals to the computation circuitry indicative of the sensed movement. In response to these motion signals and the stored reference position, the computational circuitry computes a position of the portable electronic device.

28 Claims, 4 Drawing Sheets

METHOD AND SYSTEM FOR DETERMINING POSITION INFORMATION UTILIZING A PORTABLE ELECTRONIC DEVICE LACKING GLOBAL POSITIONING SYSTEM (GPS) RECEPTION CAPABILITY

CROSS-REFERENCE TO RELATED APPLICATION

This application is related to patent Ser. No. 6,337,688, entitled "Method and System for Constructing A Virtual Reality Environment From Spatially Related Recorded Images," which was filed on even date herewith and incorporated herein by reference.

BACKGROUND OF THE INVENTION

1. Technical Field

The present invention relates in general to portable electronic devices and, in particular, to providing location and other information to portable electronic devices such as personal digital assistants (PDAs), palmtop computers, cameras, etc. Still more particularly, the present invention relates to a method and system for providing location and other information to portable electronic devices lacking global positioning system (GPS) reception capability.

2. Description of the Related Art

A global positioning system (GPS) has been utilized since the early 1980's to provide position and time information to earth-based GPS receivers. GPS includes a large number of earth-orbiting satellites that each transmit a signal containing information that permits distance measurement to be made by measuring the transit time of a pseudo-random number (PRN) code from the satellite to a GPS receiver. The GPS receiver decodes a received signal by sampling the PRN code and correlating the samples with a replica code generated by the GPS receiver, thus permitting the GPS receiver to distinguish between the GPS signal and the earth's background noise. The PRN code typically includes an implicit time signal, as measured by an atomic clock on board the GPS satellite, at which the signal left the satellite. Over time, the signal transmitted by a satellite also includes information regarding the satellite's current orbit as well as corrections for known errors in the satellite's clock. Utilizing signals received from multiple satellites, a GPS receiver can obtain relatively accurate information regarding its current position and the current time.

While GPS receivers are becoming increasingly popular in both military and consumer applications, it is currently cost prohibitive to incorporate a GPS receiver into every portable electronic device for which position and time information could be useful. As should thus be apparent, it would be useful and desirable to provide position and other information to a portable electronic device lacking GPS reception capability.

SUMMARY OF THE INVENTION

In accordance with the present invention, a portable electronic device that can obtain position information despite lacking GPS reception capability includes data storage that stores a reference position, a plurality of inertial motion sensors, and computational circuitry. The inertial motion sensors detect movement of the portable electronic device and output motion signals to the computation circuitry indicative of the sensed movement. In response to these motion signals and the stored reference position, the computational circuitry computes a position of the portable electronic device.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
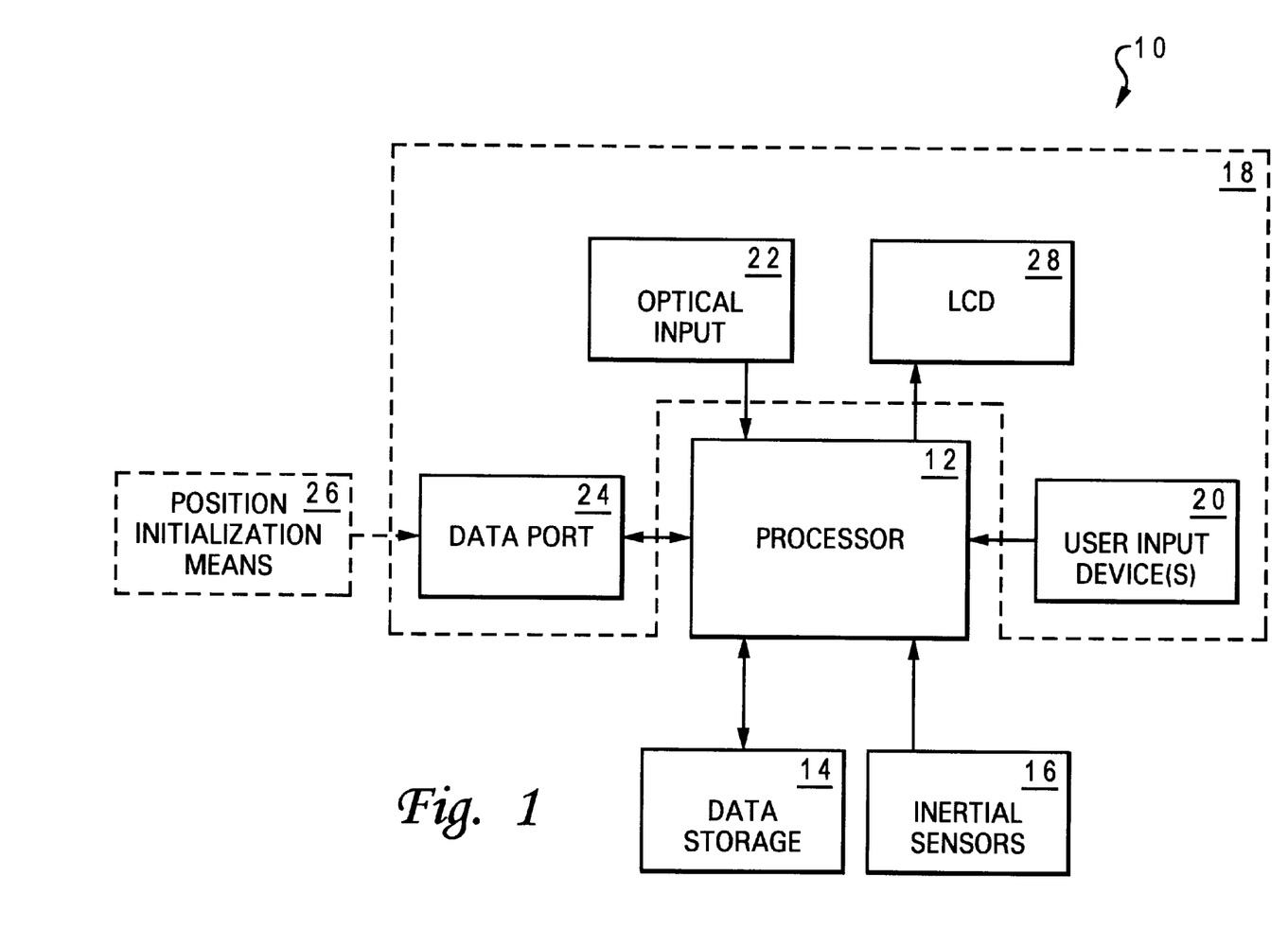
FIG. 1 depicts a block diagram of an illustrative embodiment of a portable electronic device with which the present invention may advantageously be utilized.

With reference now to the figures and in particular with reference to FIG. 1, there is depicted a high level block diagram of a portable electronic device that, in accordance with the present invention, can determine its global position without the use of an on-board GPS receiver. Portable electronic device 10 can comprise any portable electronic device, including, without limitation, a personal digital assistant (PDA), palmtop computer, mobile telephone, two-way radio, and still or video camera. In each of these embodiments, portable electronic device 10 can be broadly described as including computational circuitry such as a processor 12, which is coupled to data storage 14, inertial sensors 16, and a number of input/output (I/O) devices 18.

Processor 12 is a collection of computational circuitry that is preferably (although not necessarily) a general or special purpose processor implemented as an integrated circuit and operable in response to program instructions (e.g., contained within data storage 14). In an alternative embodiment, processor 12 can be implemented as logic circuitry that performs the functions described below without the direction of program instructions.

Data storage 14 can be implemented with any one or a combination of data storage technologies appropriate to the type of portable electronic device, including removable storage (e.g., PCMCIA cards, optical and floppy disks, and/or camera film), volatile resident storage (e.g., DRAM), and non-volatile resident storage (e.g., NVRAM and/or hard disk drive). In addition to storage for other data (e.g., program instructions), data storage 14 contains storage for a reference position of portable electronic device 10 that may be expressed, for example, in longitude, latitude, and altitude.

Portable electronic device 10 senses its movement in relation to a stored reference position utilizing inertial sensors 16. Inertial sensors 16 can be implemented with any technology that permits portable electronic device 10 to itself sense positional changes without directly receiving externally-generated (e.g., GPS) position information. One example of such technology is a piezoelectric gyroscope that detects motion in response to a disturbance in the planar oscillation of a piezoelectric crystal. It is preferred, however, to implement inertial sensors 16 as silicon chip accelerometers, which are commercially available at low cost relative to a GPS receiver. One suitable silicon chip accelerometer is the ADXL202 produced by Analog Devices of Santa Clara, Calif.

As will be appreciated, the I/O devices 18 incorporated within a particular portable electronic device 10 will vary depending upon the intended function of the device. For example, a PDA frequently includes a touch screen and stylus for user inputs, while a palmtop computer or mobile telephone typically receives user inputs via a keyboard or keypad. Although the present invention is broadly applicable to all portable electronic devices as indicated above, the present invention will hereinafter be described with respect to an illustrative embodiment in which portable electronic device 10 is a still digital camera in order to provide a more particular description of the operation of I/O devices 18.

Still referring to FIG. 1, in the illustrative embodiment in which portable electronic device 10 is a still digital camera, I/O devices 18 include a liquid crystal display (LCD) 28 that can display a variety of images, including both text, graphics, and combinations of text and graphics. When digital camera 10 is in a photography mode, LCD 28 preferably displays the image that optical input 22 would capture in response to depression of an image capture (i.e., "shutter release") button among user input devices 20. In accordance with the present invention, digital camera 10 also preferably supports a position mode in which position information (e.g., indicative of the global position of digital camera 10) is presented within LCD 28 in graphical or textual format and a logging mode in which the current position of digital camera 10 is periodically logged in data storage 14. Digital camera 10 may also advantageously display within LCD 28 a menu or similar presentation of textual or graphical (e.g., iconic) selections that may be selected via user input devices 20 in order to identify a desired mode or modes of operation. I/O devices 18 preferably further include a data port 24 for communicating a reference position, images, and other data via a wireless (e.g., RF or IR) or wired connection. As shown in FIG. 1, the reference position can be provided by a GPS receiver or other position initialization means 26, which may be located, for example, on board an automobile or at a public site.

Figure 2:
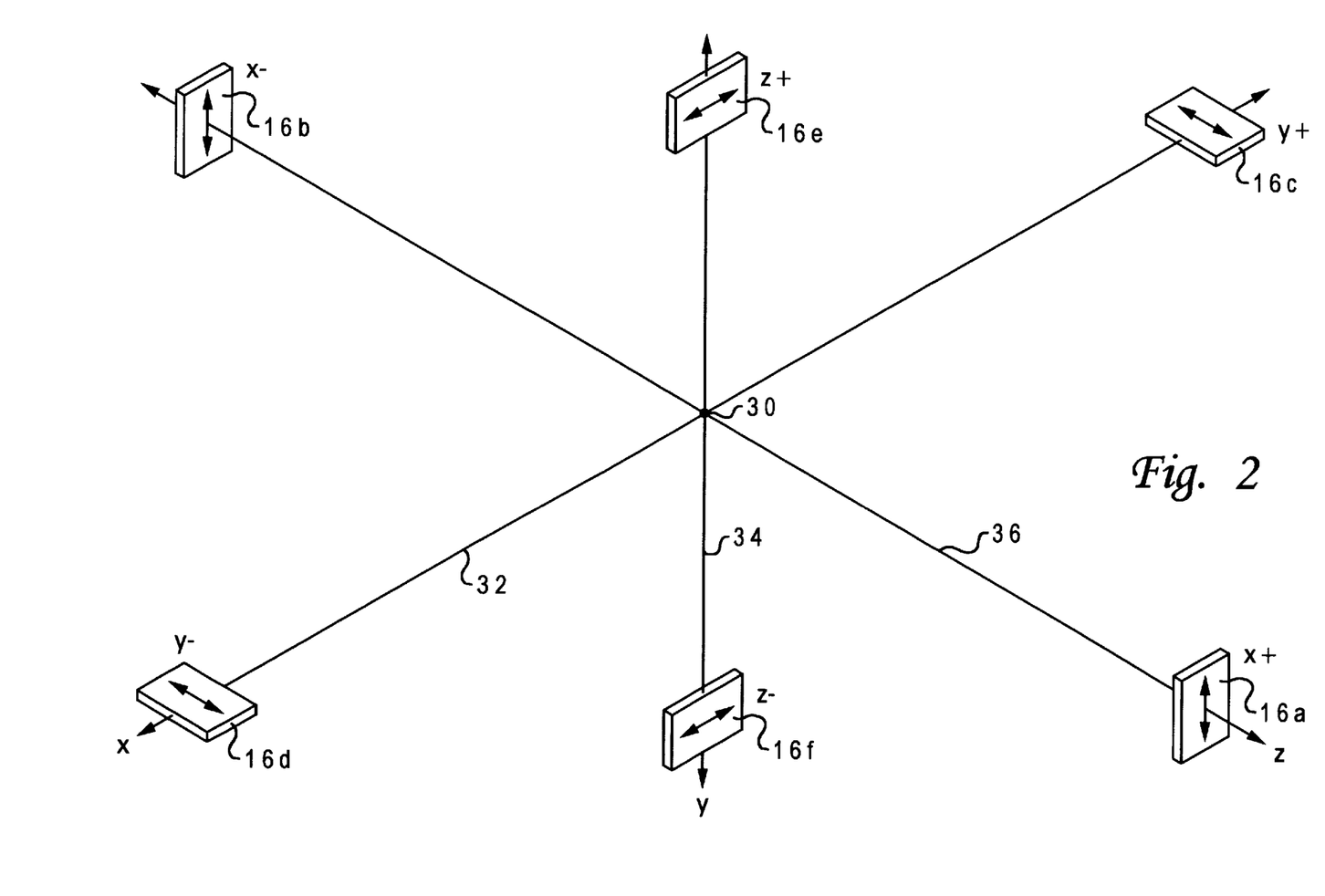
FIG. 2 illustrates a more detailed block diagram of a preferred embodiment of inertial sensors 16 of FIG. 1.

Referring now to FIG. 2, there is illustrated a more detailed block diagram of a preferred embodiment of inertial sensors 16 in which they are implemented as silicon chip accelerometers. As shown, digital camera 10 preferably include at least 6 accelerometers, including X+, X−, Y+, Y−, Z+, and Z− accelerometers 16a–16f, respectively. Pairs of accelerometers 16 are equally spaced about an origin point 30 along each of three (imaginary) orthogonal axes (i.e., X axis 32, Y axis 34, and Z axis 36), and each accelerometer 16 detects acceleration orthogonal to its associated axis in the indicated direction. That is, X+ and X− accelerometers 16a and 16b detect acceleration orthogonal to X axis 32 and parallel to Y axis 34, Y+ and Y− accelerometers 16c and 16d detect acceleration orthogonal to Y axis 34 and parallel to Z axis 36, and Z+ and Z− accelerometers 16e and 16f detect acceleration orthogonal to Z axis 36 and parallel to X axis 32. When digital camera 10 is operating, each of accelerometers 16 supplies processor 12 with a continuous stream of acceleration data indicative of its measured acceleration.

As will appreciated by those skilled in the art, processor 12 can then compute the velocity, relative orientation, and change in position of digital camera 10 based upon the acceleration data received from accelerometers 16 utilizing basic mathematical relations. For example, if the acceleration measured by X+ accelerometer 16a is $a_{X+}$, $$\int a_{X+} = v_{X+} \text{ and}$$

$$\int v_{X+} = d_{X+}$$

where $v_{X+}$ and $d_{X+}$ are the velocity and distance traveled, respectively, of X+ accelerometer 16a. In addition, the angular acceleration of X+ accelerometer 16a ($\alpha_{X+}$) can be determined from $a_{X+}$ and the known distance (R) of X+ accelerometer 16a from origin 30 according to the equation $\alpha_{X+} = a_{X+}/R$. The quantity $\alpha_{X+}$ can then be integrated once to determine the angular velocity $\omega_{X+}$ and twice to determine the angle of rotation $\theta_{X+}$ as follows:

$$\int \alpha_{X+} = \omega_{X+} \text{ and}$$

$$\int \omega_{X+} = \theta_{X+}$$

Once the linear quantities for each accelerometer 16 are determined, the linear distance digital camera 10 has traveled along each axis can be determined from the following relations:

$$d_X = d_{Z+} + d_{Z-}$$

$$d_Y = d_{X+} + d_{X-}$$

$$d_Z = d_{Y+} + d_{Y-}$$

Similarly, the angular distance that digital camera 10 has rotated about each of axes 32, 34, and 36, can be given by the following relations:

$$\theta_X = \theta_{X+} - \theta_{X-}$$

$$\theta_Y = \theta_{Y+} - \theta_{Y-}$$

$$\theta_Z = \theta_{Z+} - \theta_{Z-}$$

Figure 3A:
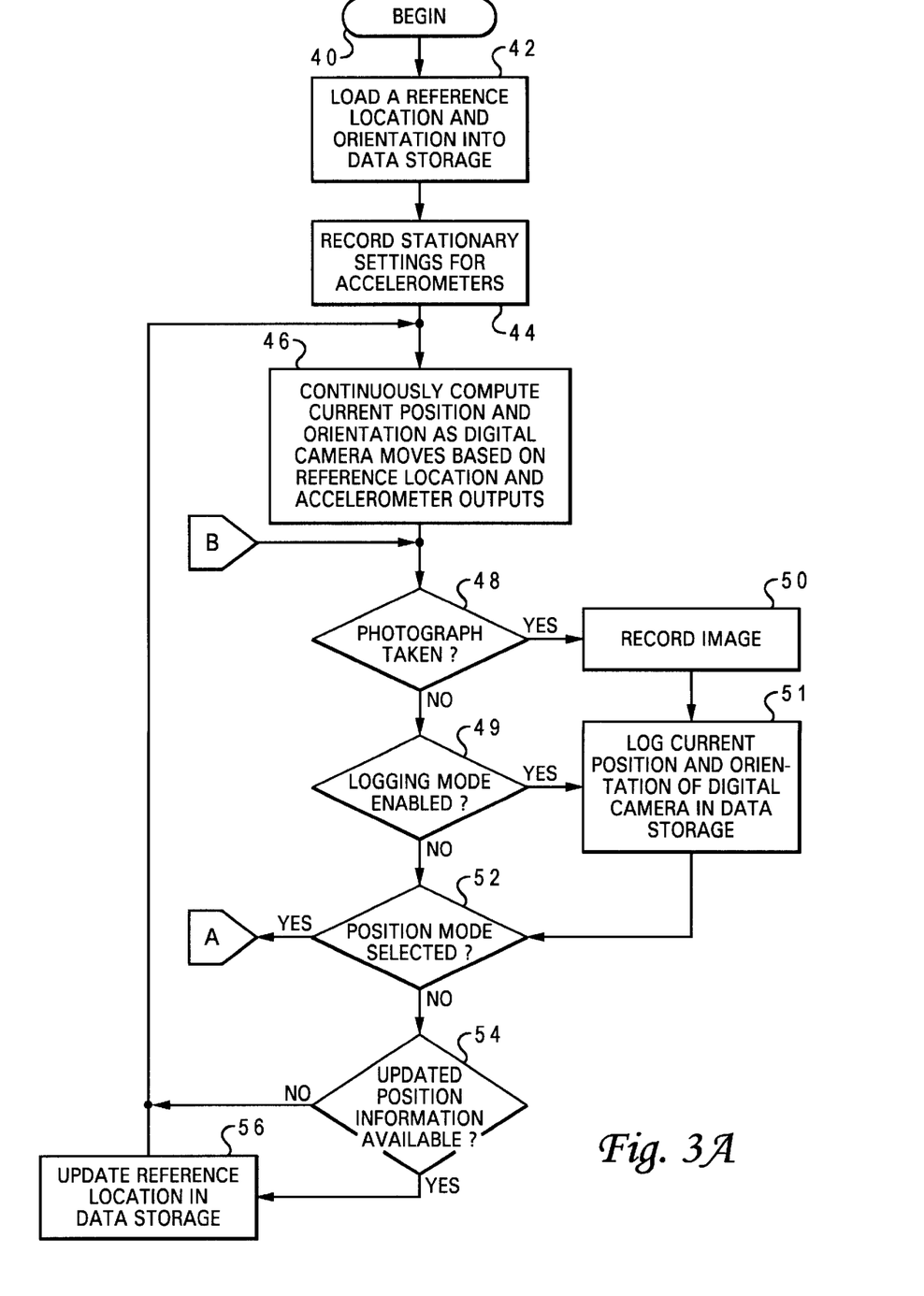
FIG. 3A is a high level logical flowchart of a method of obtaining position information at the portable electronic device of FIG. 1.

With reference now to FIG. 3A, there is illustrated a high level logical flowchart of a method of obtaining position information at a portable electronic device, such as a digital camera, in accordance with the present invention. The logical flowchart shown in FIG. 3A is intended to represent a logical sequence of operations, and it should be apparent that many of the operations can be performed in a different chronological order or in parallel.

As depicted, the process begins at block 40 and thereafter proceeds to block 42, which illustrates loading a reference position and reference orientation into data storage 14 of digital camera 10. In a typical application, block 42 is performed while digital camera 10 is held stationary at the reference location and in the reference orientation. This can be conveniently accomplished by resting digital camera 10 in a cradle (which can also advantageously serve as a charging stand for the power supply of digital camera 10) and automatically inputting the reference position and reference orientation from a GPS receiver or other position initialization means 26 via data port 24 or manually inputting the reference position and reference orientation utilizing user input devices 20. If such a cradle is not provided or available, the user of digital camera 10 can alternatively manually position and orient digital camera 10 to a known reference position and reference orientation prior to automatically or manually inputting the reference information. In addition to the reference position, which may be expressed as a longitude, latitude and altitude, and a reference orientation, which may be expressed as a roll, pitch and yaw, the reference information loaded at block 42 may also include a reference time.

The initialization of digital camera 10 continues at block 44, which depicts processor 12 recording within data storage 14 the stationary output values of each of accelerometers 16 either automatically or in response to a user input. These stationary output values calibrate digital camera 10 and permit processor 12 to thereafter accurately determine the various linear and angular accelerations.

The process then proceeds from block 44 to block 46, which illustrates processor 12 continuously computing the current location and current orientation of digital camera 10 as digital camera 10 is moved based upon the reference information stored within data storage 14 and the outputs of accelerometers 16. In addition to the current location and current orientation, which can be derived utilizing the equations detailed above, processor 12 may also calculate a current altitude by adding $d_Y$ to the reference altitude and a current time by counting a number of clock cycles since the reference time, multiplying the cycle count by the known clock period, and adding the resulting product to the reference time.

Following block 46, the process proceeds to block 48, which depicts a determination of whether a photograph has been taken, that is, whether the image capture button among user input devices 20 has been depressed. If so, the process passes to block 50, which illustrates processor 12 recording within data storage 14 the image currently sensed by optical input 22. In a typical embodiment of digital camera 10, the captured image is stored as a JPEG (Joint Photographic Experts Group) file. Of course, for a conventional camera, the image is recorded by selective exposure of photographic film. The process then proceeds to block 51, which illustrates digital camera 10 logging, in association with the captured image, the current position, orientation, and time at the moment the image was captured. This position, orientation, and time together comprise image information can either be stored as part of the image (e.g., JPEG) file itself or separately (e.g., in association with a "frame" number). In alternative embodiments in which the present invention is incorporated within a conventional camera that records images on photographic film, the image information can be recorded on the photographic film as is conventional for time and date stamps or can be stored separately in other data storage. Following block 51, the process passes to block 52, which is described below.

Referring again to block 48, in response to a determination that the image capture button has not been depressed, the process proceeds to block 49. Block 49 depicts a determination of whether a logging mode of digital camera 10 is enabled. If the logging mode is enabled, processor 12 periodically logs the current position, orientation and time of digital camera 10 within data storage 14 at default or user-determined intervals, as depicted by the process passing to block 51. Depending upon implementation, the image information logged at the time of image capture and the log information recorded at periodic intervals can be stored within data storage 14.either in a single log or in two separate logs.

Following block 51 or in response to a determination at block 49 that the logging mode is not enabled, the process proceeds to block 52. Block 52 illustrates processor 12 determining whether or not the position mode of digital camera 10 has been selected by the user, for example, via a menu displayed within LCD 28. If so, the process passes through off-page connector A to on-page connector A of FIG. 3B, which is described below. However, in response to a determination that the position mode of digital camera 10 has not been selected, the process proceeds to block 54.

Block 54 illustrates a determination of whether or not processor 12 detects the availability of updated reference information. If not, the process simply returns to block 46, which has been described. If, however, processor 12 detects the availability of updated reference information, which may, for example, be received from a proximate GPS receiver via a wireless transmission or from a user via user input devices 20, the process proceeds to block 56. As indicated, block 56 represents processor 12 replacing the appropriate reference information within data storage 14 with the updated reference information. (The replaced reference information, however, can be retained as part of the position log.) The process thereafter returns to block 46.

Figure 3B:
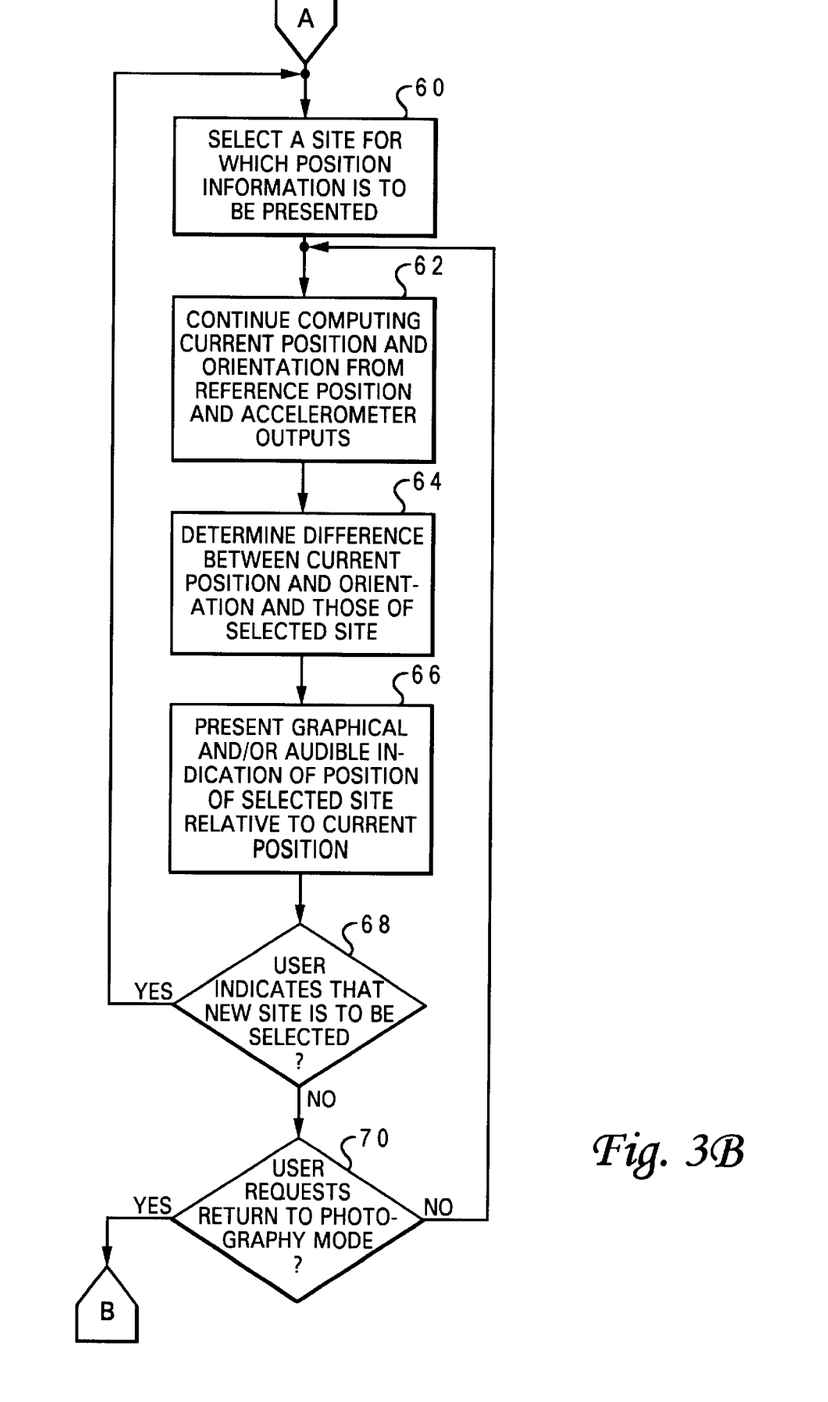
FIG. 3B is a high level logical flowchart of a method for presenting position information to a user of the portable electronic device of FIG. 1.

Referring now to FIG. 3B, there is depicted a high level logical flowchart of a method by which a portable electronic device can present position and other information in accordance with an illustrative embodiment of the present invention. The process shown in FIG. 3B begins at on-page connector A in response to a determination at block 52 of FIG. 3A that the position mode of digital camera 10 has been selected. Next, at block 60 a site for which positional information is to be presented is selected. The selection depicted at block 60 can be accomplished in numerous ways. For example, digital camera 10 could be configured to automatically select the site for which reference information is stored within data storage 14 as the default site. Alternatively or in addition, the user can be permitted to input positional information for the site via user input devices 20 or to select from among the sites logged at block 51 of FIG. 3A. User selection of a site from among the image capture sites can be assisted by permitting the user to page through captured images displayed within LCD 28 and/or by displaying for each logged site a textual description of one or more of the longitude, latitude, altitude, roll, pitch, yaw, and time.

The process proceeds from block 60 to block 62, which illustrates digital camera 10 continuing to continuously compute at least its current position and current orientation, and preferably also its current time, in the manner described above with respect to block 46 of FIG. 3A. From this current information and the site information, processor 12 of digital camera 10 can then determine the difference between the current position, orientation, and time and those of the selected site, as illustrated at block 64. As depicted at block 64, digital camera 10 then presents a graphical or audible indication of at least the direction of the selected site relative to the current position.

The graphical and audible indication presented at block 64 can be provided in a number of ways. For example, processor 12 can display within LCD 28 a plan and/or elevation view in which the position of the selected site relative to the current position of digital camera 10 is indicated by an arrow. In such a plan view, the displayed arrow would indicate only the direction of the selected site, independent of the current yaw of digital camera 10. This plan view may advantageously be combined with a graphical or textual display of the cardinal compass points and the compass direction in which digital camera 10 is pointed. In the elevation view, the arrow would represent a projection of the three-dimensional direction in which the selected site lies onto the two-dimensional surface of LCD 28. Thus, the direction of the arrow within the elevation view would take into account the current orientation (i.e., roll, pitch and yaw) of digital camera 10. In embodiments of the present invention (e.g., PDAs and palmtops) that permit graphics images to be downloaded to the portable electronic device, the orienteering capabilities of the portable electronic device can be further extended by overlaying such plan or elevation views over a corresponding topographical view of the terrain. In addition, audible outputs such as synthesized speech can be utilized to indicate the direction of the selected site.

Following block 66, the process passes to block 68, which illustrates a determination of whether or not the user of digital camera 10 has indicated (e.g., by depressing a button among user input devices 20) that a new site of interest is to be selected. If so, the process returns to block 60, which depicts the selection of a new site of interest, and thereafter repeats blocks 62 through 66. By selecting log sites according to sequential order in this manner, a user of digital camera 10 is able to retrace a previously travelled path. Alternatively, by selecting the reference position as the selected site, the user is able to determine a shortest path from the current position to the reference position.

Referring again to block 68, in response to a determination that the user has not indicated that a new site of interest is to be selected, the process passes to block 70. Block 70 depicts a determination of whether or not the user has requested a return to the photography mode of digital camera 10. If not, the process returns to block 62, which has been described. However, if the user has requested a return to the photography mode, the process returns to block 48 of FIG. 3A.

As has been described, the present invention provides a method and system that permit a portable electronic device lacking GPS reception capability to obtain and present position, orientation, and other information to a user. According to the present invention, the portable electronic device is initialized with position and other reference information at a reference position. Thereafter, as the portable electronic device is transported, the portable electronic 10 device can determine its current position, orientation, and time based upon the outputs of inertial sensors and the reference information. This current information can then be presented to a user in a variety of formats to assist the user in, among other things, locating the reference position or another selected site.

While the invention has been particularly shown and described with reference to a preferred embodiment, it will be understood by those skilled in the art that various changes in form and detail may be made therein without departing from the spirit and scope of the invention. For example, although aspects of the present invention have been described with respect to a processor executing software that directs the functions of the present invention, it should be understood that the present invention may alternatively be implemented as a program product for execution by a processor. Programs defining the functions of the present invention can be delivered to the processor via a variety of signal-bearing media, which include, without limitation, non-writable storage media (e.g., CD-ROM), writable storage media (e.g., a floppy diskette or hard disk drive), and communication media, such as computer and telephone networks. It should be understood, therefore, that such signal-bearing media, when carrying or encoding computer readable instructions that direct the functions of the present invention, represent alternative embodiments of the present invention.

What is claimed is:

1. A mobile telephone, comprising:

data storage that stores a reference position;

at least one inertial motion sensor that detects movement of said mobile telephone and outputs at least one motion signal indicative of said movement;

computational circuitry coupled to said data storage and to said at least one inertial motion sensor, wherein said computational circuitry computes a position of said mobile telephone in response to said reference position and said at least one motion signal; and at least one input device that receives user inputs and at least one output device that presents outputs.

2. A portable electronic device, comprising:

data storage that stores a reference position;

at least one input device that receives user inputs and a least one output device that presents outputs;

at least one inertial motion sensor that detects movement of said portable electronic device and outputs at least one motion signal indicative of said movement; and computational circuitry coupled to said memory and to said at least one inertial motion sensor, wherein said computational circuitry computes a position of said portable electronic device in response to said reference position and said at least one motion signal, wherein said computational circuitry computes a distance between said computed position and an input position received via said user input device and a bearing from said computed position to said input position, and wherein said computational circuitry presents, via said output device an indication of said bearing.

3. The portable electronic device of claim 2, wherein:

said output device is a display having a two-dimensional surface; and said indication of said bearing comprises a graphical element indicating a three-dimensional direction of said input position as projected on said two-dimensional surface of said display.

4. The portable electronic device of claim 3, wherein said computational circuitry comprises means for causing said display to present an indication of cardinal directions in conjunction with said graphical element.

5. The portable electronic device of claim 2, wherein said at least one inertial motion sensor comprises at least one accelerometer.

6. The portable electronic device of claim 2, wherein said at least one inertial motion sensor comprises a piezoelectric gyroscope.

7. The portable electronic device of claim 2, wherein said computational circuitry computes both said position and an angular orientation of said portable electronic device in response to said reference position and said at least one motion signal.

8. The portable electronic device of claim 2, wherein said computational circuitry logs a plurality of computed positions in said data storage.

9. A method for providing a portable electronic device with an indication of its position, said method comprising:

storing, within data storage of said portable electronic device, a reference position;

detecting movement of said portable electronic device utilizing at least one inertial motion sensor within said portable electronic device and outputting, from said at least one inertial motion sensor, at least one motion signal indicative of said movement;

utilizing computational circuitry within said portable electronic device, computing a position of said portable electronic device in response to said reference position and said at least one motion signal;

computing a distance between said computed position and an input position received via an user input device and computing a bearing from said computed position to said input position: and presenting, via an output device of said portable electronic device, an indication of said bearing.

10. The method of claim 9, said method further comprising presenting said computed position utilizing said output device.

11. The method of claim 9, wherein said output device is a display having a two-dimensional surface, and wherein presenting an indication of said bearing comprises presenting a graphical element indicating a three-dimensional direction of said input position as projected on said two-dimensional surface of said display.

12. The method of claim 11, and further comprising presenting an indication of cardinal directions in conjunction with said graphical element.

13. The method of claim 9, wherein detecting movement of said portable electronic device comprises detecting movement of said portable electronic device utilizing at least one accelerometer.

14. The method of claim 9, wherein detecting movement of said portable electronic device comprises detecting movement of said portable electronic device utilizing at least one piezoelectric gyroscope.

15. The method of claim 9, and further comprising computing both said position and an angular orientation of said portable electronic device in response to said reference position and said at least one motion signal.

16. The method of claim 9, and further comprising logging a plurality of computed positions in said data storage.

17. A program product for providing a portable electronic device including data storage, and input device, an output device, and at least one inertial motion sensor with its position, said program product comprising:

a position program, including:

instruction means for computing a position of said portable electronic device in response to a reference position and at least one motion signal provided by said at least one inertial motion sensor;

instruction means for computing a distance between said computed position and an input position received via said user input device;

instruction means for computing a bearing from said computed position to said input position;

instruction means for presenting, via said output device, an indication of said bearing; and a medium usable by said portable electronic device that encodes said position program.

18. The program product of claim 17, said position program further instruction means for presenting said computed position utilizing said output device.

19. The program product of claim 17, wherein said output device is a display having a two-dimensional surface, and wherein said instruction means for presenting an indication of said bearing comprises instruction means for presenting a graphical element indicating a three-dimensional direction of said input position as projected on said two-dimensional surface of said display.

20. The program product of claim 19, and further comprising instruction means for presenting an indication of cardinal directions in conjunction with said graphical element.

21. The program product of claim 17, said position program further comprising instruction means for computing an angular orientation of said portable electronic device in response to said reference position and said at least one motion signal.

22. The program product of claim 17, said position program further comprising instruction means for logging a plurality of computed positions in the data storage of the portable electronic device.

23. A method for providing a portable electronic device with an indication of its position, said method comprising:

attaching said portable electronic device to a position initialization device and downloading from said position initialization device to said portable electronic device an initial current global position of said portable electronic device;

detaching said portable electronic device from said position initialization device;

thereafter, continually detecting movement of said portable electronic device utilizing at least one inertial motion sensor within said portable electronic device and outputting, from said at least one inertial motion sensor, at least one motion signal indicative of said movement; and utilizing computational circuitry within said portable electronic device, continually computing a next current global position of said portable electronic device in response to said initial current global position and said at least one motion signal.

24. The method of claim 23, wherein said attaching comprises attaching said portable electronic device to a global positioning satellite receiver.

25. A portable electronic device, comprising:

a data port adapted to be attached to and detached from a position initialization device;

data storage;

means for downloading an initial current global position of said portable electronic device from said position initialization device to said data storage;

at least one inertial motion sensor that detects movement of said portable electronic device and continuously outputs at least one motion signal indicative of said movement;

means for, while said portable electronic device is detached from said position initialization device, continually computing a next current global position of said portable electronic device in response to said initial current global position and said at least one motion signal; and at least one output device that presents the next current global position of said portable electronic device.

26. The portable electronic device of claim 25, wherein said means for downloading comprises means for downloading the initial current global position of said portable electronic device from a global positioning satellite receiver.

27. A program product for providing a portable electronic device with an indication of its position, said program product comprising:

a position program, comprising:

instruction means for downloading, from a position initialization device attached to said portable electronic device, an initial current global position of said portable electronic device;

instruction means for, while said portable electronic device is detached from said position initialization device, continually computing a next current global position of said portable electronic device based upon said initial current global position and at least one motion signal indicative of movement produced by at least one inertial motion sensor; and a medium usable by said portable electronic device that encodes said position program.

28. The program product of claim 27, wherein said instruction means for downloading comprises instruction means for downloading said initial current global position from a global positioning satellite receiver.

* * * * *

UNITED STATES PATENT AND TRADEMARK OFFICE
CERTIFICATE OF CORRECTION

PATENT NO. : 6,542,824 B1
DATED : April 1, 2003
INVENTOR(S) : Viktors Berstis It is certified that error appears in the above-identified patent and that said Letters Patent is hereby corrected as shown below:

<u>Title page, Item [54] and Column 1, line 5,</u>
Please insert -- SATELLITE -- between "(GPS)" and "RECEPTION"

Signed and Sealed this

Twenty-sixth Day of August, 2003

JAMES E. ROGAN
*Director of the United States Patent and Trademark Office*